United States Patent
Liu et al.

(10) Patent No.: US 10,618,415 B2
(45) Date of Patent: Apr. 14, 2020

(54) CHARGER, CHARGING SYSTEM WITH THE CHARGER, AND AERIAL VEHICLE WITH THE CHARGER

(71) Applicant: SZ DJI TECHNOLOGY CO., LTD., Shenzhen (CN)

(72) Inventors: Yuancai Liu, Shenzhen (CN); Lei Wang, Shenzhen (CN); Wentao Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 176 days.

(21) Appl. No.: 15/795,608

(22) Filed: Oct. 27, 2017

(65) Prior Publication Data
US 2018/0065493 A1 Mar. 8, 2018

Related U.S. Application Data

(63) Continuation of application No. PCT/CN2015/078045, filed on Apr. 30, 2015.

(51) Int. Cl.
*B60L 11/18* (2006.01)
*H02J 7/00* (2006.01)
(Continued)

(52) U.S. Cl.
CPC .......... *B60L 11/1811* (2013.01); *B60L 53/20* (2019.02); *B60L 53/65* (2019.02); *B60L 58/22* (2019.02); *H02J 7/0004* (2013.01); *H02J 7/0014* (2013.01); *B60L 2200/10* (2013.01); *B60L 2210/30* (2013.01); *B60L 2240/549* (2013.01); *B64C 2201/042* (2013.01);
(Continued)

(58) Field of Classification Search
USPC ........................................................ 320/116
See application file for complete search history.

(56) References Cited

U.S. PATENT DOCUMENTS 8,829,911 B2 * 9/2014 Rich .................... H01M 10/42
324/433
8,899,903 B1 * 12/2014 Saad .................... B65G 67/00
320/109

(Continued)

FOREIGN PATENT DOCUMENTS

CN  101039039 A  9/2007
CN  101335461 A  12/2008
(Continued)

OTHER PUBLICATIONS

The World Intellectual Property Organization (WIPO) International Search Report for PCT/CN2015/078045 dated Sep. 29, 2015 6 Pages.

*Primary Examiner* — Robert Grant
(74) *Attorney, Agent, or Firm* — Anova Law Group, PLLC

(57) ABSTRACT

A charger includes a power output interface configured to output a charging signal, a signal interface configured to acquire charging information of a battery, a balance charging interface configured to perform balance charging control over sets of battery cores of the battery, and a control circuit electrically connected to the power output interface, the signal interface, and the balance charging interface. The control circuit is configured to select the signal interface and/or the balance charging interface to perform charging control over the battery.

18 Claims, 2 Drawing Sheets

(51) Int. Cl.
*B60L 58/22* (2019.01)
*B60L 53/65* (2019.01)
*B60L 53/20* (2019.01)

(52) U.S. Cl.
CPC ... *H02J 2007/0098* (2013.01); *Y02T 10/7005* (2013.01); *Y02T 10/7061* (2013.01); *Y02T 10/7072* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 30/14* (2013.01)

(56) References Cited

U.S. PATENT DOCUMENTS

| | | | |
|---|---|---|---|
| 2008/0297104 A1 | 11/2008 | Rao et al. | |
| 2013/0049698 A1* | 2/2013 | Jung | H02J 7/0016 320/134 |
| 2014/0239896 A1* | 8/2014 | Takeshita | H02J 7/0024 320/117 |

FOREIGN PATENT DOCUMENTS

| | | |
|---|---|---|
| CN | 202190096 U | 4/2012 |
| CN | 102437625 A | 5/2012 |
| CN | 102751541 A | 10/2012 |
| CN | 104113116 A | 10/2014 |
| JP | H1198714 A | 4/1999 |
| JP | 2009011055 A | 1/2009 |
| WO | 2012175848 A3 | 6/2013 |

\* cited by examiner

CHARGER, CHARGING SYSTEM WITH THE CHARGER, AND AERIAL VEHICLE WITH THE CHARGER

CROSS-REFERENCE TO RELATED APPLICATION

This is a continuation application of International Application No. PCT/CN2015/078045, filed on Apr. 30, 2015, the entire contents of which are incorporated herein by reference.

TECHNICAL FIELD

The present disclosure relates to the field of battery charging technologies, and in particular, to a charger, a charging system with the charger, and an aerial vehicle with the charger.

BACKGROUND

With development of science and technology, aerial photography becomes increasingly popular. For example, an Unmanned Aerial Vehicle (UAV) aerial image technology has been liked by photographers for its lower cost than that of manned aerial image and safety. The UAV aerial image capturing usually requires an aerial vehicle to carry a video camera, a photo camera, and other image shooting devices. The aerial vehicle is generally powered by a secondary rechargeable battery. The rechargeable battery may be divided into two types, a non-intelligent rechargeable battery and a smart rechargeable battery. However, existing chargers cannot be fully compatible with the aforementioned two types of rechargeable batteries. Therefore, if the two types of rechargeable batteries are charged by using an existing charger, safety hazards may exist. Moreover, designing a corresponding charger for each different rechargeable battery may lead to a waste of resources.

SUMMARY

A charger compatible with a smart battery and a non-smart battery, a charging system with the charger, and an aerial vehicle with the charger are disclosed.

One aspect of the present disclosure is directed to a charger. The charger may comprise a power output interface, a signal interface, a balance charging interface, and a control circuit. The control circuit is electrically connected to the power output interface, the signal interface, and the balance charging interface respectively. The power output interface outputs a charging signal. The signal interface acquires charging information of a battery. The balance charging interface performs balance charging control over respective sets of battery cores of the battery. In accordance with a type of the battery, the control circuit selects the signal interface and the balance charging interface to perform charging control over the battery.

Further, the charging information comprises at least one of design information of the battery or status information of the battery.

Further, the charging signal comprises at least one of a charging voltage or a charging current.

Further, the charger further comprises a power supply conversion unit electrically connected to the power output interface and the control circuit, wherein the power supply conversion unit processes an alternating current or a direct current under the control of the control circuit, to convert the alternating current or the direct current to a charging signal required by the battery.

Further, the charger further comprises a power input interface electrically connecting an external power supply and the power supply conversion unit, wherein the power input interface accesses the alternating current or direct current from the external power supply and outputs the alternating current or direct current to the power supply conversion unit.

Further, the power supply conversion unit comprises an alternating current-direct current (AC-DC) conversion unit and a direct current-direct current (DC-DC) conversion unit.

Further, the AC-DC conversion unit converts the alternating current to a direct current and outputs the direct current to the DC-DC conversion unit.

Further, the DC-DC conversion unit is electrically connected to the AC-DC conversion unit and the control circuit, and processes the direct current output by the AC-DC conversion unit under the control of the control circuit to convert the direct current to the charging signal required by the battery.

Further, the power supply conversion unit comprises a DC-DC conversion unit electrically connected to the control circuit, and processes the direct current under the control of the control circuit and converts the direct current to the charging signal required by the battery.

Further, the charger further comprises a voltage and current collection unit, wherein the voltage and current collection unit electrically connects the power supply conversion unit and the control circuit, collects voltage information and current information of a charging signal output by the power supply conversion unit, and sends the collected voltage information and the current information to the control circuit.

Further, the charger further comprises a voltage and current collection unit, wherein the voltage and current collection unit electrically connects the power supply conversion unit and the control circuit, collects voltage information and current information of a charging signal output by the power supply conversion unit, and sends the collected voltage information and the current information to the control circuit.

Further, the voltage and current collection unit electrically connects the DC-DC conversion unit and the control circuit.

Further, the voltage and current collection unit is electrically connected between the DC-DC conversion unit and the power output interface, and electrically connects to the control circuit.

Further, the control circuit further intelligently identifies the battery in accordance with the charging information of the battery; and when the charger does not match a model of the battery, the control circuit controls the power supply conversion unit to stop outputting the charging signal.

Further, the battery is a non-smart battery.

Further, the charger further comprises a battery core voltage collection unit electrically connecting the control circuit and the balance charging interface.

Further, the battery core voltage collection unit communicates with the non-smart battery through the balance charging interface to acquire charging voltage information of the non-smart battery.

Further, the control circuit, in accordance with the charging voltage information of the non-smart battery collected by the battery core voltage collection unit, performs balance charging control over the non-smart battery through the balance charging interface.

Further, the charger further comprises a battery core balancing unit electrically connecting the control circuit and the balance charging interface, wherein, after the battery core voltage collection unit collects voltage information of respective sets of battery cores in the non-smart battery, the control circuit starts the battery core balancing unit, in accordance with the voltage information of the respective sets of battery cores, to balance charging voltages of the respective sets of battery cores in the non-smart battery, causing the respective sets of battery cores in the non-smart battery to all have a fullest capacity.

Another aspect of the current disclosure is directed to a charging system, comprising a battery and the charger as described above, wherein the charger charges the battery.

Another aspect of the current disclosure is directed to an aerial vehicle comprises a motor and the charging system as described above, wherein the battery provides power to the motor.

Another aspect of the current disclosure is directed to a charger, comprising a power input interface, a power supply conversion unit, a power output interface, a signal interface, a balance charging interface and a control circuit, and the power input interface. The power supply conversion unit and the power output interface are electrically connected in sequence. The power output interface, the signal interface and the balance charging interface are all electrically connected to a battery. The control circuit is electrically connected to the signal interface, the power output interface, and the balance charging interface respectively. The power input interface accesses an external power supply. The control circuit controls the power supply conversion unit to convert an electrical signal output by the external power supply to a charging signal required by the battery. The power output interface receives a charging signal output by the power supply conversion unit. The signal interface acquires charging information of a battery. The balance charging interface performs balance charging control over respective sets of battery cores of the battery. In accordance with a type of the battery, the control circuit selects the signal interface and the balance charging interface to perform charging control over the battery.

Further, the charging information comprises at least one of design information of the battery or status information of the battery.

Further, the charging signal comprises at least one of a charging voltage or a charging current.

Further, the external power supply is an alternating current power supply, the power supply conversion unit comprises an alternating current-direct current (AC-DC) conversion unit and a direct current-direct current (DC-DC) conversion unit, the AC-DC conversion unit is electrically connected with the power input interface, and converts an alternating current, provided by the external power supply and output by the power input interface, to a direct current and output the direct current to the DC-DC conversion unit, and the DC-DC conversion unit is electrically connected to the AC-DC conversion unit and the control circuit, and processes the direct current output by the AC-DC conversion unit under the control of the control circuit to convert the direct current to a charging signal required by the battery.

Further, the external power supply is a direct current power supply, the power supply conversion unit comprises a DC-DC conversion unit, the DC-DC conversion unit is electrically connected to the external power supply; and the control circuit through the power input interface, and the DC-DC conversion unit processes a direct current voltage accessed by the power input interface from the external power supply under the control of the control circuit and converts the direct current voltage to a charging signal required by the battery.

Further, the charger further comprises a voltage and current collection unit, wherein the voltage and current collection unit electrically connects the power supply conversion unit and the control circuit, collects voltage information and current information of a charging signal output by the power supply conversion unit, and sends the voltage information and the current information collected to the control circuit.

Further, the charger further comprises a voltage and current collection unit, wherein the voltage and current collection unit electrically connects the power supply conversion unit and the control circuit, collects voltage information and current information of a charging signal output by the power supply conversion unit, and sends the voltage information and the current information collected to the control circuit.

Further, the voltage and current collection unit electrically connects the DC-DC conversion unit and the control circuit.

Further, the voltage and current collection unit is electrically connected between the DC-DC conversion unit and the power output interface, and electrically connects to the control circuit.

Further, the control circuit further intelligently identifies the battery in accordance with the charging information of the battery, and when the charger does not match a model of the battery, the control circuit controls the power supply conversion unit to stop outputting the charging signal.

Further, the battery is a non-smart battery; the charger further comprises a battery core voltage collection unit; the balance charging interface electrically connects to the non-smart battery; the battery core voltage collection unit electrically connects the control circuit and the balance charging interface; the battery core voltage collection unit communicates with the non-smart battery through the balance charging interface to acquire charging voltage information of the non-smart battery; and the control circuit, in accordance with the charging voltage information of the non-smart battery collected by the battery core voltage collection unit, performs balance charging control over the non-smart battery through the balance charging interface.

Further, the charger further comprises a battery core balancing unit electrically connecting the control circuit and the balance charging interface, wherein, after the battery core voltage collection unit collects voltage information of the respective sets of battery cores in the non-smart battery, the control circuit starts the battery core balancing unit in accordance with the voltage information of the respective sets of battery cores, to balance charging voltages of the respective sets of battery cores in the non-smart battery, causing the respective sets of battery cores in the non-smart battery to all have a fullest capacity.

Another aspect of the current disclosure is directed to a charging system, comprising a battery and the charger as described above, wherein the charger charges the battery.

Another aspect of the current disclosure is directed to an aerial vehicle, comprising a motor and the charging system as described above, wherein the battery provides power to the motor.

The charger in the present disclosure may be suitable for a smart battery and a non-smart battery at the same time, that is, the charger can charge the smart battery and can also charge the non-smart battery. In this way, it is not necessary to set a corresponding charger separately for each type of battery, and thus the charger has higher practicality. In addition, the charger may further intelligently identify and authenticate the smart battery and the non-smart battery, so as to ensure that the charger only charges the battery matching it, which can thus effectively protect the battery and extend the service life of the battery, thereby preventing occurrence of a safety incident.

MAIN COMPONENTS AND REFERENCE NUMBERS

Figure 1:
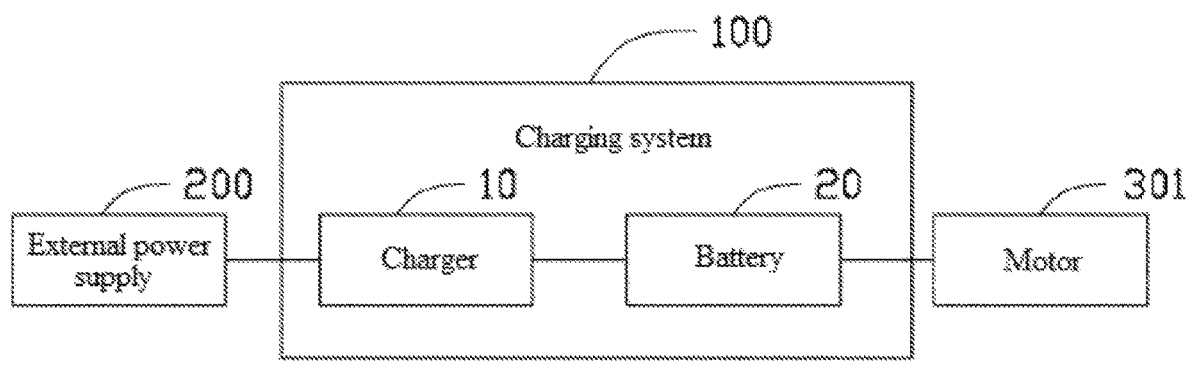
FIG. 1 is a schematic diagram illustrating an application environment of a charging system, according to an embodiment of the present disclosure.

Aerial vehicle 300
Charging system 100
Charger 10
Power input interface 11
Power supply conversion unit 12
AC-DC conversion unit 121
DC-DC conversion unit 123
Power output interface 13
Signal interface 14
Control circuit 15
Voltage and current collection unit 16
Balance charging interface 17
Battery core voltage collection unit 18
Battery core balancing unit 19
Battery 20
External power supply 200
Motor 301

DETAILED DESCRIPTION OF THE EMBODIMENTS

Technical solutions of the present disclosure will be described with reference to the drawings. It will be appreciated that embodiments as described in the disclosure are a part rather than all of the embodiments of the present disclosure. Other embodiments, which are conceived by those having ordinary skills in the art on the basis of the disclosed embodiments without inventive efforts, should fall within the scope of the present disclosure.

Referring to FIG. 1, a preferred embodiment of the present disclosure provides an aerial vehicle 300, including a charging system 100 and a motor 301. The charging system 100 includes a charger 10 and a battery 20. The battery 20 may be a smart battery, mounted on the aerial vehicle 300, to provide power for the motor 301 on the aerial vehicle 300. The charger 10 is electrically connected to the battery 20 to charge the battery 20.

Figure 2:
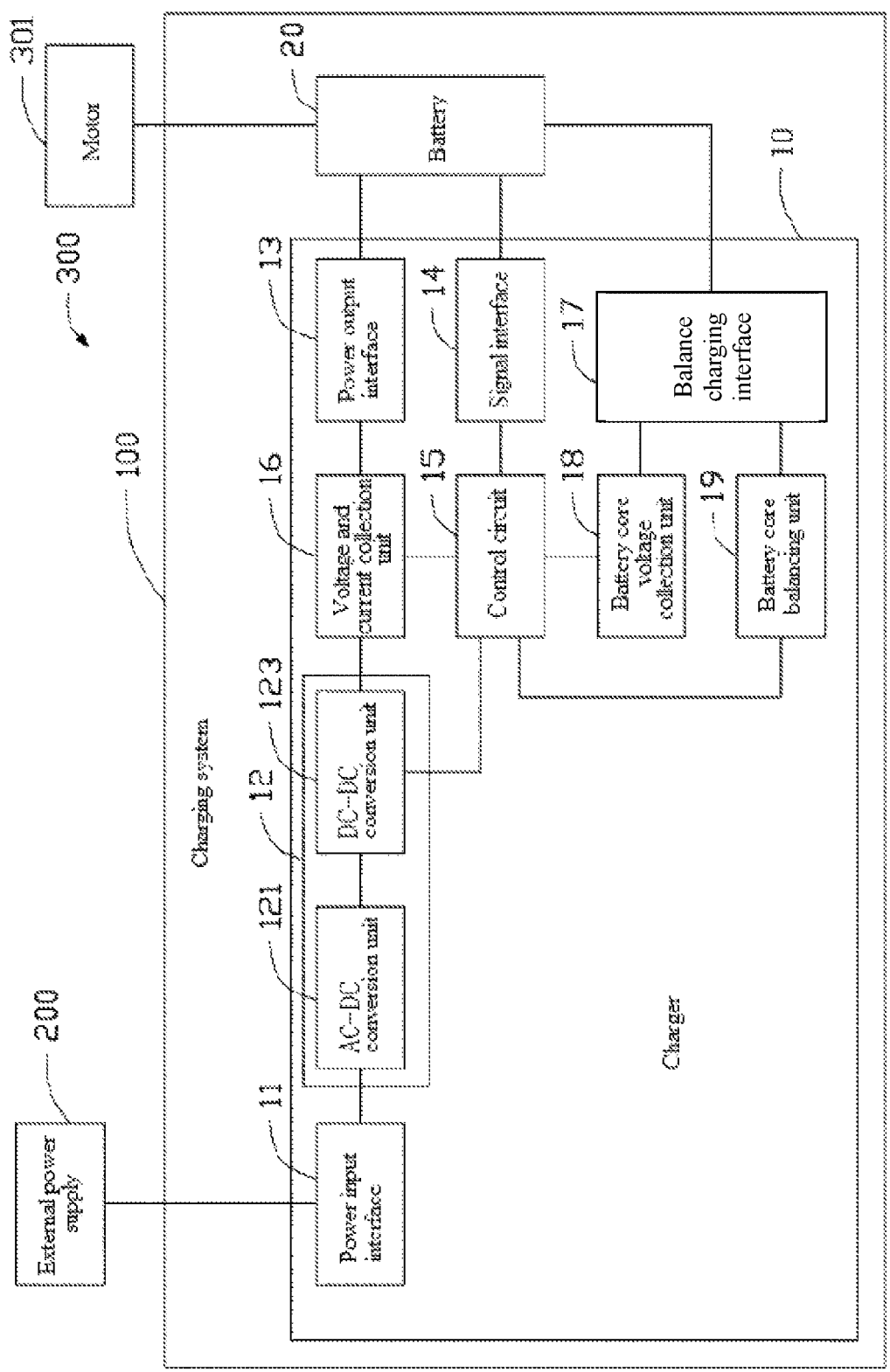
FIG. 2 is a block diagram illustrating the charging system and the battery shown in FIG. 1.

Referring to FIG. 2, the charger 10 includes a power input interface 11, a power supply conversion unit 12, a power output interface 13, a signal interface 14, and a control circuit 15. The power input interface 11 is electrically connected to an external power supply 200 to access an alternating current or direct current from the external power supply 200. In one embodiment, the external power supply 200 is an alternating current power supply, for example, a main supply. Therefore, the power input interface 11 accesses an alternating current from the external power supply 200.

In one embodiment, the power supply conversion unit 12 includes an alternating current-direct current (AC-DC) conversion unit 121 and a direct current-direct current (DC-DC) conversion unit 123. The AC-DC conversion unit 121 is electrically connected with the power input interface 11. The AC-DC conversion unit 121 may consist of a step-down transformer, a full wave rectifier, a filter capacitor, and other electronic elements. The AC-DC conversion unit 121 converts an alternating current, which is provided by the external power supply 200 and output by the power input interface 11, to a direct current and output the direct current to the DC-DC conversion unit 123. The DC-DC conversion unit 123 is electrically connected with the AC-DC conversion unit 121 and the control circuit 15. Under the control of the control circuit 15, the DC-DC conversion unit 123 processes the direct current output by the AC-DC conversion unit 121 and converts the direct current to a charging signal required by the battery 20. In one embodiment, the charging signal required by the battery 20 may include at least one of the followings: a charging voltage and a charging current.

It can be understood that, in some embodiments, the external power supply 200 may be a direct current power supply. That is, the external power supply 200 may output a direct current having a constant voltage or constant current to the power input interface 11. In this way, the AC-DC conversion unit 121 may not be required. That is, the power supply conversion unit 12 may only include the DC-DC conversion unit 123. The DC-DC conversion unit 123 is connected to the external power supply 200 directly through the power input interface 11, so as to process a direct current voltage inputted by the power input interface 11 from the external power supply 200 and to convert the direct current voltage to a charging signal required by the battery 20.

The power output interface 13 is electrically connected to an output end of the power supply conversion unit 12. Further, the power output interface 13 is electrically connected to the DC-DC conversion unit 123 to receive a charging signal from the DC-DC conversion unit 123 and to output the charging signal to the battery 20. That is, the charger 10 charges the battery 20 through the power output interface 13.

The signal interface 14 is electrically connected with the control circuit 15 and the battery 20 to establish an electrical connection between the control circuit 15 and the battery 20, enabling the control circuit 15 to communicate with the battery 20 through the signal interface 14 and to acquire charging information of the battery 20. In one embodiment, the charging information at least includes design information of the battery 20 and status information of the battery 20. The charging information of the battery 20 may include at least one of the following: design information of the battery 20 and status information of the battery 20. For example, the charging information of the battery 20 at least includes the design set number of the battery, design capacity of the battery, a design voltage of the battery, the maximum allowable charging current, current capacity of the battery, a current battery temperature of the battery, and so on.

The control circuit 15 is electrically connected with the power supply conversion unit 12. The control circuit 15 is electrically connected with the DC-DC conversion unit 123. The control circuit 15 controls the DC-DC conversion unit 123 in accordance with the charging information of the battery 20 obtained by the signal interface 14, and intelligently adjusts the charging signal output by the DC-DC conversion unit 123 to safely charge the battery 20. For example, the control circuit 15 may intelligently adjust the charging signal output by the DC-DC conversion unit 123 in accordance with the maximum charging voltage and with the maximum charging current of the battery 20. For another example, if the control circuit 15 acquires, through the signal interface 14, a current temperature of the battery 20 higher than a preset temperature value, the control circuit 15 can control the DC-DC conversion unit 123 to temporarily stop outputting the charging signal, until the temperature of the battery 20 is restored to a normal range. For still another example, the control circuit 15 may acquire current battery capacity of the battery 20 in real time through the signal interface 14, and re-adjust the charging signal output by the DC-DC conversion unit 123, until the battery 20 is fully charged.

It can be understood that the control circuit 15 may further intelligently identify and authenticate the battery 20 in accordance with the charging information of the battery 20. That is, only identified battery 20 can be charged or be charged with a large current. When the control circuit 15 determines, in accordance with the charging information of the battery 20, that the charger 10 cannot charge the battery 20, that is, the charger 10 does not match the model of the battery 20, the control circuit 15 may control the DC-DC conversion unit 123 to stop outputting the charging signal, thereby protecting the battery 20 and preventing damages to or explosions of the battery 20.

The charger 10 further includes a voltage and current collection unit 16. In one embodiment, the voltage and current collection unit 16 electrically connects the power supply conversion unit 12 and the power output interface 13. Further, the voltage and current collection unit 16 electrically connects to the DC-DC conversion unit 123, the power output interface 13, and the control circuit 15. The voltage and current collection unit 16 collects voltage information and current information of a charging signal output by the DC-DC conversion unit 123 and sends the collected voltage information and the current information to the control circuit 15, so that the control circuit 15 can monitor, in real time, the charging signal output by the DC-DC conversion unit 123. In some embodiments, the voltage and current collection unit 16 may not be connected to the power output interface 13. That is, the voltage and current collection unit 16 may only connect to the DC-DC conversion unit 123 and the control circuit 15.

The charger 10 may further be compatible with a non-smart battery. For example, the battery 20 may not have a self-balancing function. The non-smart battery includes multiple sets of battery cores connected in series or in parallel. At this point, the charger 10 further includes a balance charging interface 17 and a battery core voltage collection unit 18. The balance charging interface 17 electrically connects to the non-smart battery through a cable, and then performs balance charging control over respective sets of battery cores of the non-smart battery. The battery core voltage collection unit 18 electrically connects the control circuit 15 and the balance charging interface 17. In this way, the battery core voltage collection unit 18 may electrically connects to the non-smart battery through the balance charging interface 17, and then communicates with the non-smart battery to enable the battery core voltage collection unit 18 to acquire charging voltage information of the non-smart battery through the balance charging interface 17. In this way, the control circuit 15 can configure a corresponding charging signal in accordance with the charging voltage information of the non-smart battery collected by the battery core voltage collection unit 18, then control the DC-DC conversion unit 123 to output the set charging signal through the power output interface 13 to charge the non-smart battery.

In some embodiments, if the non-smart battery includes battery design information, the control circuit 15 may also communicate with the non-smart battery through the signal interface 14, then acquire charging information of the non-smart battery, and identify and authenticate the non-smart battery. That is, only when it passes through identification, the non-smart battery may be charged or charged with a large current. However, when the control circuit 15 determines in accordance with charging information of the non-smart battery that the charger 10 cannot charge the non-smart battery, that is, the charger 10 does not match the model of the non-smart battery, the control circuit 15 may control the DC-DC conversion unit 123 to stop outputting the charging signal, thereby protecting the non-smart battery, and preventing damages to or explosions of the non-smart battery.

In some embodiments, the control circuit 15 may further control current voltages of respective sets of battery cores of the non-smart battery through the balance charging interface 17 in accordance with the charging voltage information of the non-smart battery collected by the battery core voltage collection unit 18. For example, when the battery 20 is a non-smart battery, the charger 10 further includes a battery core balancing unit 19. The battery core balancing unit 19 electrically connects the control circuit 15 and the balance charging interface 17. The non-smart battery may cause charging voltages of the respective sets of battery cores to be inconsistent with each other in the process of charging. Therefore, after the battery core voltage collection unit 18 collects the voltage information of the respective sets of battery cores in the non-smart battery, the control circuit 15 may start the battery core balancing unit 19 in accordance with the voltage information of the respective sets of battery cores. For example, the control circuit 15 causes the battery core balancing unit 19 to discharge battery cores with higher voltages in the non-smart battery, to balance the charging voltages of the respective sets of battery cores in the non-smart battery, so that the respective sets of battery cores in the non-smart battery can have the fullest capacity.

The aforementioned charger 10 may be work with a smart battery and a non-smart battery at the same time, that is, the charger 10 can charge the smart battery and can also charge the non-smart battery. In this way, it is not necessary to set a corresponding charger 10 for each type of battery 20, and thus the charger has more practical usage. In addition, the charger 10 may further intelligently identify and authenticate the smart battery and the non-smart battery, to ensure that the charger 10 only charges a matching battery 20, effectively protecting the battery 20, extending the service life of the battery 20, and preventing incidents.

The charging system 100 is not limited to charging the battery 20 of the aerial vehicle 300, which may also be applied to any other apparatuses with a battery, for example, vehicles, ships, and so on.

The foregoing disclosure is merely illustrative of the embodiments of the disclosure but not intended to limit the scope of the disclosure. Any equivalent modifications to a structure or process flow, which are made without departing from the specification and the drawings of the disclosure, and a direct or indirect application in other relevant technical fields, shall also fall into the scope of the disclosure.

What is claimed is:

1. A charger, comprising:
    a power output interface configured to output a charging signal;
    a balance charging interface configured to perform balance charging control over sets of battery cores of a battery;
    a control circuit electrically connected to the power output interface and the balance charging interface;
    a battery core voltage collection unit electrically connecting the control circuit and the balance charging interface, the battery core voltage collection unit being configured to communicate with the battery through the balance charging interface to acquire charging voltage information of the battery;
    wherein the control circuit is configured to perform balance charging control over the battery through the balance charging interface according to the charging voltage information of the battery.

2. The charger of claim 1, wherein:
    the charger further comprises a signal interface configured to acquire charging information of the battery;
    the charging information comprises at least one of design information of the battery or status information of the battery; and
    the charging signal comprises at least one of a charging voltage or a charging current.

3. The charger of claim 2, further comprising:
    a power supply conversion unit electrically connected to the power output interface and the control circuit, the power supply conversion unit being configured to process an input alternating current or an input direct current under a control of the control circuit, to convert the input alternating current or the input direct current to a charging signal for the battery.

4. The charger of claim 3, further comprising:
    a power input interface electrically connecting an external power supply and the power supply conversion unit, the power input interface being configured to receive the input alternating current or the input direct current from the external power supply and output the input alternating current or the input direct current to the power supply conversion unit.

5. The charger of claim 3, wherein:
    the power supply conversion unit comprises an alternating current-direct current (AC-DC) conversion unit and a direct current-direct current (DC-DC) conversion unit electrically connected to the AC-DC conversion unit and the control circuit,
    the AC-DC conversion unit is configured to convert the input alternating current to an output direct current and outputs the output direct current to the DC-DC conversion unit, and
    the DC-DC conversion unit is configured to process the output direct current under a control of the control circuit to convert the output direct current to the charging signal.

6. The charger of claim 3, wherein the power supply conversion unit comprises a direct current-direct current (DC-DC) conversion unit electrically connected to the control circuit, and configured to process the input direct current under a control of the control circuit and convert the input direct current to the charging signal.

7. The charger of claim 3, further comprising:
    a voltage and current collection unit electrically connecting the power supply conversion unit and the control circuit, the voltage and current collection unit being configured to collect voltage information and current information of the charging signal, and send the voltage information and the current information to the control circuit.

8. The charger of claim 3, wherein the control circuit is further configured to:
    identify the battery in accordance with the charging information of the battery; and
    when the charger does not match a model of the battery, control the power supply conversion unit to stop outputting the charging signal.

9. The charger of claim 1, further comprising:
    a battery core balancing unit electrically connecting the control circuit and the balance charging interface,
    wherein the control circuit is further configured to, after the battery core voltage collection unit collects voltage information of respective sets of battery cores in the battery, start the battery core balancing unit in accordance with the voltage information, to balance charging voltages of the respective sets of battery cores in the battery, causing the respective sets of battery cores in the battery to all have a fullest capacity.

10. An aerial vehicle, comprising:
    a motor; and
    a charging system including:
        a battery; and
        the charger of claim 1,
    wherein the charger is configured to charge the battery and the battery is configured to provide power to the motor.

11. A charger, comprising:
    a power input interface configured to access an external power supply;
    a power supply conversion unit electrically connected to the power input interface;
    a signal interface electrically connected to a battery and configured to acquire charging information of the battery;
    a balance charging interface electrically connected to the battery and configured to perform balance charging control over respective sets of battery cores of the battery;
    a control circuit electrically connected to the signal interface and the balance charging interface;
    a battery core voltage collection unit electrically connecting the control circuit and the balance charging interface, the battery core voltage collection unit being configured to communicate with the non-smart battery through the balance charging interface to acquire charging voltage information of the non-smart battery; and
    a power output interface electrically connected to the power supply conversion unit, the control circuit, and the battery, and configured to receive and output the charging signal;
    wherein the control circuit being configured to:
        control the power supply conversion unit to convert an electrical signal from the external power supply to a charging signal for the battery,
        in accordance with a type of the battery, select the signal interface and/or the balance charging interface to perform charging control over the battery, and
        in accordance with the charging voltage information of the non-smart battery, perform balance charging control over the non-smart battery through the balance charging interface.

12. The charger of claim 11, wherein:
the charging information comprises at least one of design information of the battery or status information of the battery, and
the charging signal comprises at least one of a charging voltage or a charging current.

13. The charger of claim 11, wherein:
the external power supply includes an alternating current power supply, and
the power supply conversion unit comprises:
- an alternating current-direct current (AC-DC) conversion unit electrically connected with the power input interface, the AC-DC conversion unit being configured to receive an alternating current from the external power supply through the power input interface, convert the alternating current to a direct current, and output the direct current; and
- a direct current-direct current (DC-DC) conversion unit electrically connected to the AC-DC conversion unit and the control circuit, the DC-DC conversion unit being configured to process the direct current output by the AC-DC conversion unit under a control of the control circuit to convert the direct current to the charging signal.

14. The charger of claim 11, wherein:
the external power supply includes a direct current power supply, and
the power supply conversion unit comprises a direct current-direct current (DC-DC) conversion unit electrically connected to the external power supply through the power input interface and connected to the control circuit, the DC-DC conversion unit being configured to, under a control of the control circuit, process a direct current voltage received from the external power supply through the power input interface, convert the direct current voltage to the charging signal.

15. The charger of claim 11, further comprising:
a voltage and current collection unit electrically connecting the power supply conversion unit and the control circuit, the voltage and current collection unit being configured to collect voltage information and current information of the charging signal, and send the voltage information and the current information to the control circuit.

16. The charger of claim 11, wherein the control circuit is further configured to:
identify the battery in accordance with the charging information of the battery, and
when the charger does not match a model of the battery, control the power supply conversion unit to stop outputting the charging signal.

17. The charger of claim 11, further comprising:
a battery core balancing unit electrically connecting the control circuit and the balance charging interface,
wherein the control circuit is further configured to, after the battery core voltage collection unit collects voltage information of the respective sets of battery cores in the battery, start the battery core balancing unit in accordance with the voltage information, to balance charging voltages of the respective sets of battery cores in the battery, causing the respective sets of battery cores in the battery to all have a fullest capacity.

18. An aerial vehicle, comprising:
a motor; and
a charging system including:
a battery; and
the charger of claim 11,
wherein the charger is configured to charge the battery and the battery is configured to provide power to the motor.

* * * * *